United States Patent [19]
Timpert

[11] Patent Number: 5,826,742
[45] Date of Patent: Oct. 27, 1998

[54] DEVICE AND METHOD FOR THE TRANSPORT OF HAZARDOUS GOODS RECEPTACLES IN CONTAINERS

[75] Inventor: Friedhelm Hermann Timpert, Sonnenhang 18, D-21335 Luneberg, Germany

[73] Assignee: Friedhelm Hermann Timpert, Luneberg, Germany

[21] Appl. No.: 750,813
[22] PCT Filed: Jun. 12, 1995
[86] PCT No.: PCT/EP95/02266
§ 371 Date: Mar. 12, 1997
§ 102(e) Date: Mar. 12, 1997
[87] PCT Pub. No.: WO95/34490
PCT Pub. Date: Dec. 21, 1995

[30] Foreign Application Priority Data

Jun. 13, 1994 [DE] Germany ............ 44 22 004.9

[51] Int. Cl.⁶ .................................. B65D 21/02
[52] U.S. Cl. .................. 220/23.6; 220/514; 220/519; 206/821
[58] Field of Search .................. 220/512, 513, 220/514, 519, 23.6; 206/821, 501

[56] References Cited

U.S. PATENT DOCUMENTS

| | | | |
|---|---|---|---|
| 2,766,891 | 10/1956 | Elzer | 206/821 |
| 2,912,139 | 11/1959 | Talley | 206/821 |
| 3,180,537 | 4/1965 | Collins | 206/821 |
| 3,237,802 | 3/1966 | Wagner | 206/821 |
| 3,317,087 | 5/1967 | Landis | 206/821 |
| 3,354,515 | 11/1967 | Robinson | 206/821 |
| 3,885,672 | 5/1975 | Westenrieder et al. | 206/821 |
| 4,116,332 | 9/1978 | Hartley | 206/821 |
| 4,593,818 | 6/1986 | Schenkman | 206/821 |

Primary Examiner—Joseph M. Moy
Attorney, Agent, or Firm—Foley & Lardner

[57] ABSTRACT

The invention concerns a transport device for dangerous goods containers and a process for securing dangerous goods containers inside a transport container. The transport device comprises an ISO container and a system for securing the dangerous goods containers within it. According to the invention, the system comprises: a first set of moulded units (10) which lie adjacent to one another and form a first receiving surface which completely occupies the floor of the container and has openings (12) into each of which the bottom section of a dangerous goods container (2) fits precisely; and a second set of moulded units (20) with openings (21) into each of which the top section of a dangerous goods container fits precisely and so designed that, when fitted adjacent to one another on the dangerous goods containers on the first receiving surface, they form a second receiving surface which completely occupies an intermediate level of the container parallel to the floor.

14 Claims, 3 Drawing Sheets

DEVICE AND METHOD FOR THE TRANSPORT OF HAZARDOUS GOODS RECEPTACLES IN CONTAINERS

The invention relates to a transport device for hazardous goods receptacles, with an ISO container receiving the hazardous goods receptacles and means for securing the loads of the hazardous goods receptacles within the container, and to a method for securing the loads of hazardous goods receptacles in ISO containers for transport.

U.S. Pat. No. 3,375,919 discloses a transport device for yarn spools in a package. The transport device comprises the features of the preamble of claim 1. In particular, the transport device comprises a first receiving surface which fills the bottom surface of the package as a single part and is shaped such that a plurality of yarn spools can be fitted in a regular pattern and with a precise fit onto the first receiving surface. Onto the yarn spools a second, correspondingly shaped integral receiving surface is placed in reverse orientation, which second receiving surface engages an upper portion of the yarn spools and which completely fills an intermediate suface of the package. Onto the intermediate surface a further receiving surface is placed onto which a second layer of yarn spools is placed, the upper portions of the second layer of yarn spools being finally engaged by a forth receiving surface, which completely fills the cover surface of the package. Corresponding receiving surfaces consisting of a single part, would, in case of ISO containers, be very difficult to handle and would result in substantial complications when loading and unpacking the containers.

Publication WO 85/01714 describes a method for accommodating barrels of a certain size into an ISO container. For accommodating barrels of 55 US gallons size in an ISO-container it is proposed that the scarf joints at the base and at the lid of the barrel are pressed inwardly so that the outer diameter of the scarf joints is reduced and adapted to the largest outer diameter of the barrel wall. Furthermore, the reinforcing mouldings on the outer circumference of the barrel are changed so that in the small side of the container four barrels can be accommodated side by side, and that along the length of the container 10 rows of barrels can be arranged. Such a dense package of barrels in containers is, for hazardous goods recepticals, not in compliance with safety regulations since, with the barrels abutting each other, upon acceleration of the container the inertial forces of all barrels in a row act on the container wall without any dampening which can result in damaging of the container walls during the prescribed acceleration test.

The invention relates in particular to the transport of radioactive wastes which are stored in hazardous goods receptacles such as say steel drums which are adapted for transport in ISO containers. Special safety provisions, such as are set out in the Law relating to the Conveyance of Hazardous Goods and the Hazardous Goods Exemption Order issued on the basis of the latter, apply to such materials. Listed in the Hazardous Goods Exemption Order of 23.6.1993 is Exemption no. 49, which sets out allowability conditions for ISO containers which are to be used for the transport of LSA and SCO materials. Inter alia, it must be demonstrated that the containers and the lashing of the cargo additionally withstand increased load stresses relative to the ISO standard. According to Exemption no. 49 of the Inland Waterways, Railways and Roads Hazardous Goods Order, certain radioactive substances may be transported in containers only if the latter including the load-securing devices can, at the maximum permissible total mass of the cargo and the maximum permissible mass of the individual items to be lashed, absorb the forces at the following accelerations:

twice the gravitational acceleration in longitudinal direction, once the gravitational acceleration horizontally sideways, once the gravitational acceleration vertically upwards, and twice the gravitational acceleration vertically downwards.

A safety coefficient of 1.5 must be demonstrated.

Previously, hazardous goods receptacles with radioactive contents, steel drums typically being used, were lashed with stretch straps in order to secure the load in the containers. The stretch straps were laid running round several drums and secured in the side walls of the container. This type of load securing has proved disadvantageous in various regards.

Although an individual stretch strap is well specifiable per se as regards tensile strength and elongation properties, this does not transfer directly to a predictability of the load stress conditions in a group of lashed items when the stretch strap is guided round this group in a complicated way.

In particular, it is difficult in practical handling to secure hazardous goods receptacles, such as say steel drums, which have no special guide possibilities (e.g. securing lugs or tongues) for the stretch straps, reliably and in a reproducible manner according to a preset lashing plan. Furthermore, during the transport of the containers, shaking and movement of the receptacles within the container inevitably result, so that the lashing straps can slip against them and drastic changes in the load-bearing capacity of the load-securing means can thus result.

Another consequence of these problems with the securing of the loads of hazardous goods receptacles by lashing is that the load-bearing capacity of the load-securing means is not mathematically predictable in practice, so that run-up trials have to be carried out experimentally anew under real conditions for every loading plan of hazardous goods receptacles with specific weights and specific lashing plans in order to demonstrate that the containers and the load-securing means withstand the above-mentioned acceleration values. This is very costly, as several run-up trials basically have to be carried out for every loading plan.

The object of the present invention is to provide a transport device for hazardous goods receptacles in which the latter can be secured in a reliable manner and in a way that is stable even during shaking and vibrations, and to offer a method of securing the loads of hazardous goods receptacles in ISO containers.

The transport device of the type mentioned at the outset with the characterizing features of claim 1, and the method with the features of claim 11, serve to achieve this object. Advantageous versions of the invention are listed in the dependent claims.

According to the invention, the transport device comprises a first receiving surface formed by a plurality of separate first preshaped parts (10) which are movable one against the other and which abut one against the other and, at the edges of the first receiving surface, are supported by the container walls. The first preshaped parts have openings which are adapted to the base of the hazardous good containers and serve for receiving with a precise fit a lower region of a hazardous goods receptacle. Furthermore, the second receiving surface is formed by a plurality of separate second preshaped parts which are movable one against the other and which have corresponding openings to be capable of being fitted onto an upper region of the hazardous goods receptacles. The second preshaped parts are formed such that they, fitted onto the hazardous goods receptacles placed on the first receiving surface, form in abutment against each other the second receiving surface which completely fills an intermediate surface, parallel to the bottom surface, of the container and at its edge is supported by the container walls. Furthermore, recesses are provided at the edges of the first and second preshaped parts by which recesses cavities open to the top are formed into which wedges can be inserted between adjoining preshaped parts. By the insertion of wedges it is ensured that, during shaking or distortions of the device caused by transport and the relative movement of the preshaped parts among one another that is caused thereby, the wedges drop further into the cavities through the effect of their weight, as a result of which the receiving surfaces are further secured and pressed against the container walls. A self-stabilization of the load-securing means is thereby achieved.

Through the measures according to the invention, a transport device is created for hazardous goods receptacles which securely fits tight even during vibrations and shaking caused by transport. Furthermore, the first and second receiving surfaces which enclose the hazardous goods receptacles above and below absorb in a well definable manner the forces of inertia of the hazardous goods receptacles which occur during accelerations of the transport device, and pass them on to the container walls.

A particular advantage of the measures according to the invention is that, because the hazardous goods receptacles are enclosed in the receiving surfaces, the forces distribution and force dissipation occurring because of the forces of inertia of the hazardous goods receptacles are well definable and basically computable. This is true in particular for the forces, otherwise difficult to describe, in the case of longitudinal and transverse directions of the container. Here in a simple model for a preset loading plan the majority of the known masses of the hazardous goods receptacles which are connected to the neighbouring hazardous goods receptacles or the fixed container walls via compression springs can be considered, the compression springs serving to describe regions of the receiving surfaces between the respective hazardous goods receptacles. The essential properties of such a system of coupled oscillators are computable in advance, so that the lay-out of the load-securing means that is to be undertaken for specific loading plans can be determined without having to carry out run-up trials for every loading plan under real conditions in order to check whether the device withstands the prescribed accelerations.

The preshaped parts are advantageously made from an elastically deformable material so that forces of inertia taken up by the receiving surfaces are absorbed with elastic deformation of the receiving surfaces.

In another preferred version, the second preshaped parts are provided with openings on both sides, so that the second receiving surface, when it is placed onto the hazardous goods receptacles fitted in the first receiving surface, in turn has openings on the upper side, each for receiving with a precise fit a lower region of a hazardous goods receptacle, so that another layer of hazardous goods receptacles can be fitted onto the second receiving surface. The second layer of hazardous goods receptacles can in turn be secured on the upper side by a third receiving surface, which, like the second receiving surface, is fitted onto the layer of hazardous goods receptacles and completely fills an intermediate surface, parallel to the bottom surface, of the container.

The invention is explained in more detail in the following with reference to an embodiment in the drawings in which.

Figure 1:
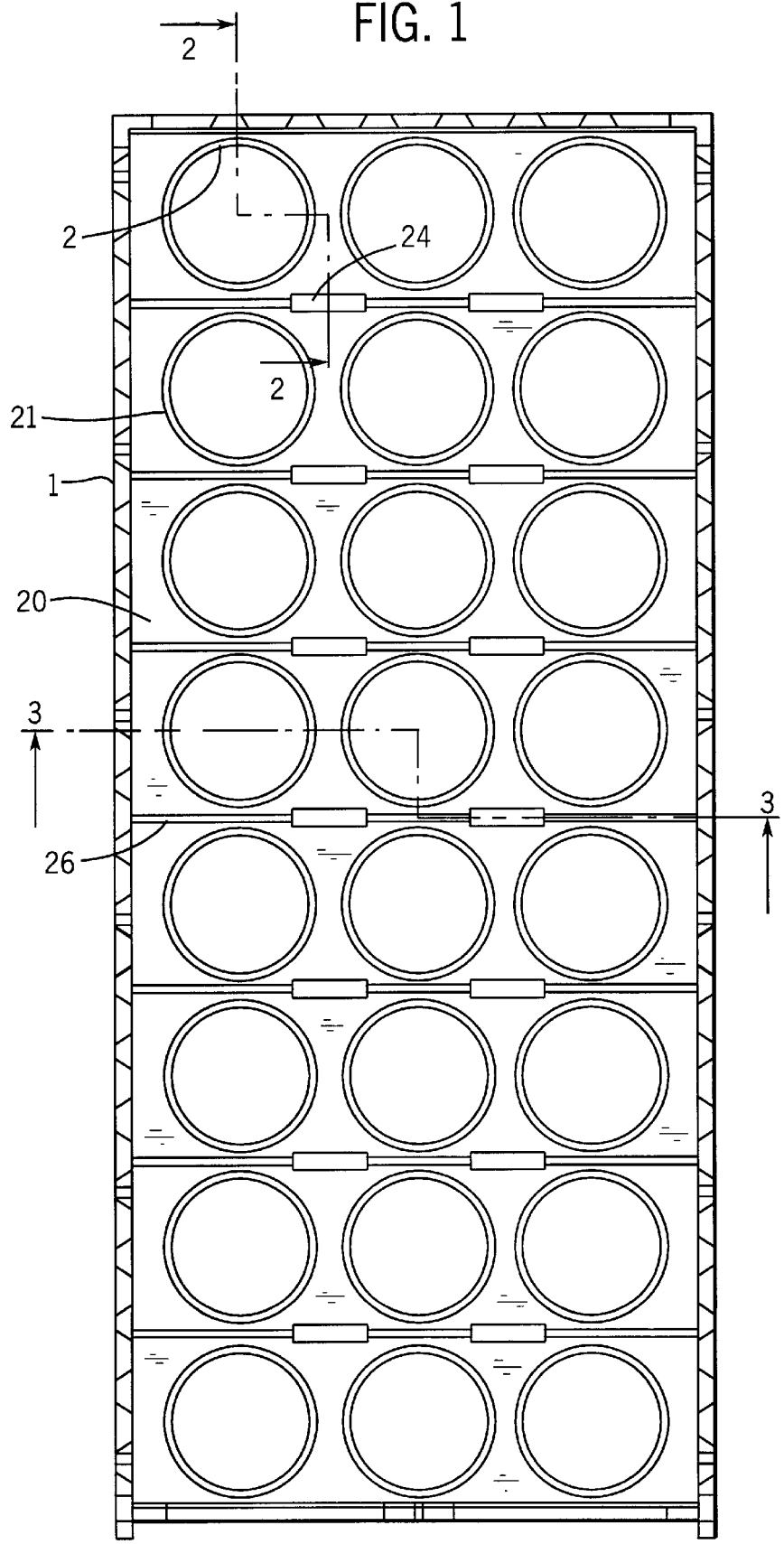
FIG. 1 shows a sectional view of the transport device in the section through the second receiving surface.

A 20-foot ISO special container 1, into which hazardous goods receptacles 2 in the form of 200-liter drums are fitted, is shown in FIG. 1.

Figure 2:
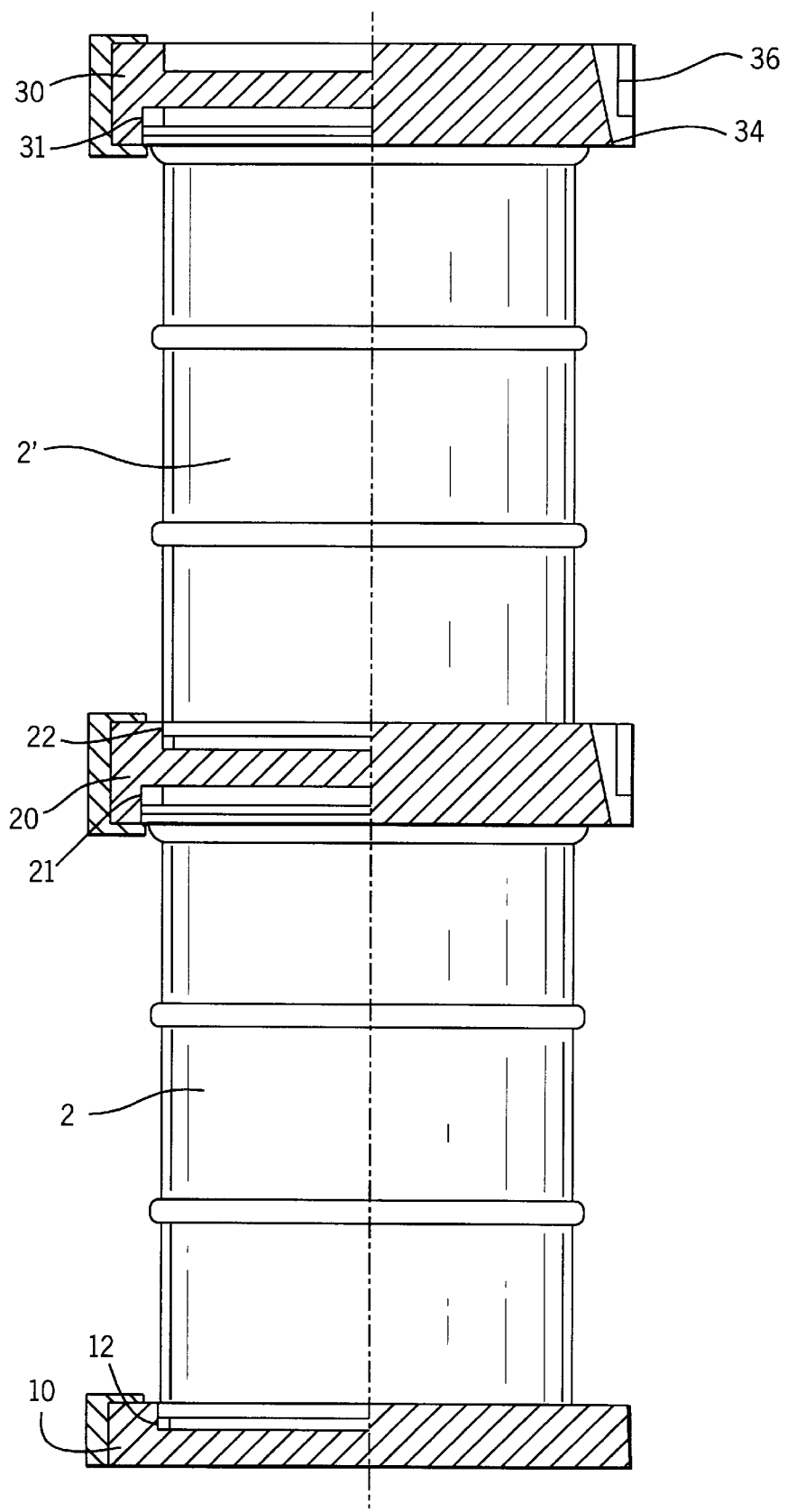
FIG. 2 shows a section through the transport device along the line 2—2 from FIG. 1.

A lateral sectional representation along the line A—A from FIG. 1 is shown in FIG. 2. The bottom surface of the container 1 is completely covered by eight rectangular first preshaped parts 10 abutting one against the other. Every preshaped part 10 extends transversely to the longitudinal direction of the container 1 from one side wall to the other and is provided with three openings 12, each for receiving with a precise fit a lower region of a hazardous goods receptacle 2. It is to be noted that preshaped parts must in each case be provided for specific receptacle types, namely for standard receptacles such as 200-liter and 280-liter drums. In the shown example, 24 drums can be fitted onto the first receiving surface.

Fitted onto the hazardous goods receptacles 2 are second preshaped parts 20 which are provided on the underside with openings 21 each for receiving with a precise fit an upper region of a hazardous goods receptacle 2. The second preshaped parts 20 have their openings 21 so arranged that they can be fitted onto the hazardous goods receptacles 2 and then, abutting one against the other, completely fill an intermediate surface, parallel to the bottom surface of the container 1, of the container.

In the preferred version, the second preshaped parts 20 correspond in their dimensions to the first preshaped parts 10, so that the second receiving surface has a corresponding structure like the first receiving surface described above.

Provided in the edges of the second preshaped parts 20 are recesses 24 which, between adjoining preshaped parts 20, form wedge-shaped cavities in the second receiving surface, into which wedges with high weight, such as say lead-filled sheet steel wedges, can be inserted, these dropping further into the cavities 24 under their weight during transport in the case of shaking or vibrations in the receiving surfaces, and thus ensuring a stabilization.

The preshaped parts 20 of the second receiving surface are in turn fitted on the upper side with openings 22 which, like the openings 12 in the first receiving surface, are each formed for receiving with a precise fit a lower region of a hazardous goods receptacle 2'. It is thereby possible to provide, for a specific stowage plan, that a second layer of hazardous goods receptacles 2' is fitted onto the second receiving surface. This second layer of hazardous goods receptacles 2' can be secured on the upper side by a third receiving surface which is formed from third preshaped parts 30, which, abutting one against the other, completely fill an intermediate surface parallel to the bottom surface of the container. The third preshaped parts 30 can have the same structure as the second preshaped parts 20, in particular be provided with recesses 34 in the edges, to form cavities tapering like wedges for the insertion of wedges as described above.

Figure 3:
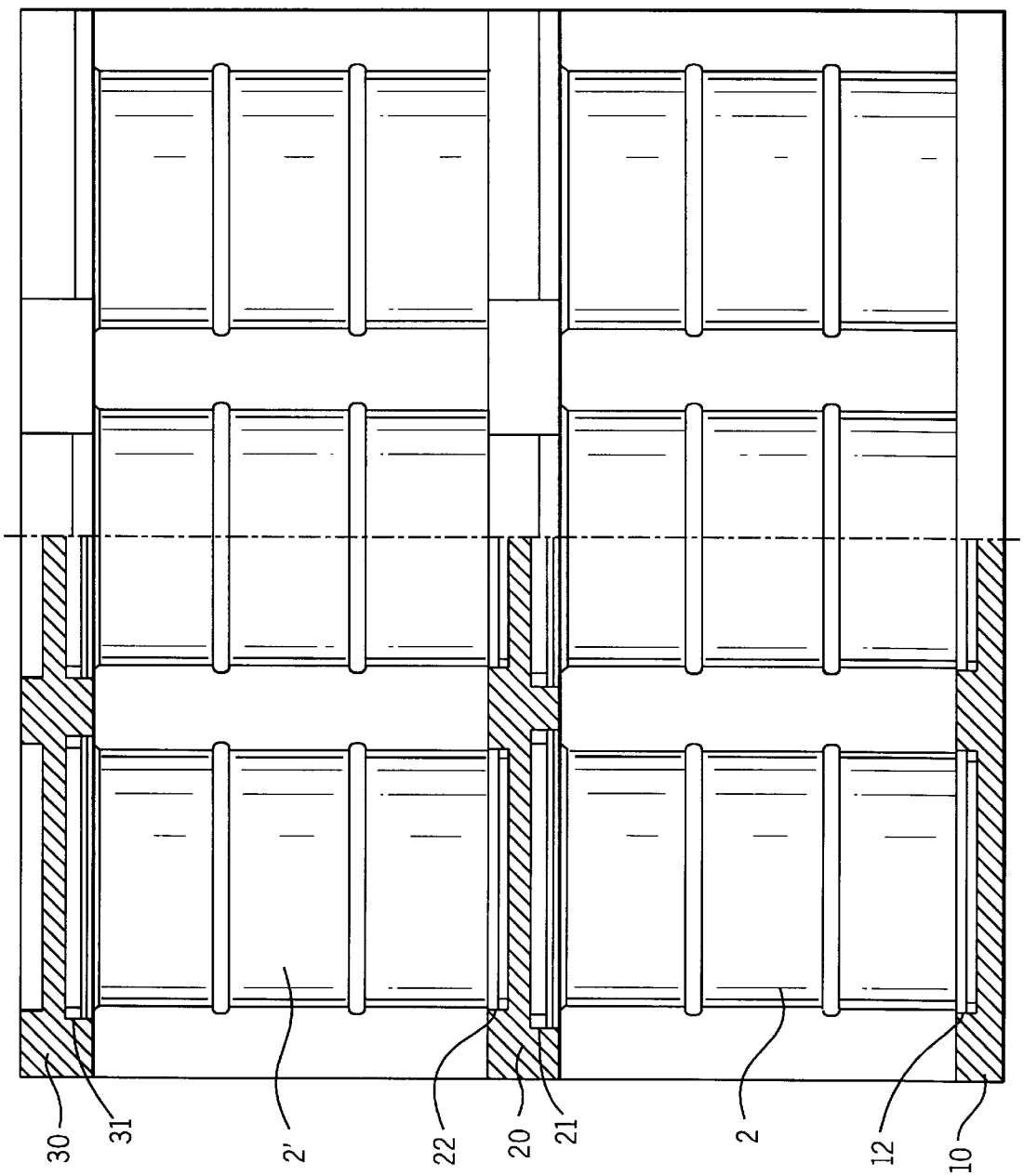
FIG. 3 shows a section through the transport device along the line 3—3 from FIG. 1.

As is to be seen in FIGS. 2 and 3, the second and third preshaped parts 20 and 30 are provided on the upper side with recesses which form grooves 26 and 36 running transversely to the longitudinal axis of the container in the second and third receiving surfaces. In each case a holding rod, lockable in the container side walls, can be inserted into these. The holding rods serve to secure the second and third preshaped parts against movements perpendicular to the receiving surface.

The first, second and third preshaped parts 10, 20 and 30 are, outside the region of the openings, preferably made as sheets of constant thickness. The preshaped parts are preferably so designed according to their dimensions and the modulus of elasticity of the material that a large part of the forces of inertia of the hazardous goods receptacles is elastically absorbed upon accelerations. The preshaped parts are preferably made from an elastomer material which, with a typical thickness of the preshaped parts, allows the occurring forces of inertia of the hazardous goods receptacles to be elastically absorbed for the required acceleration values.

Preshaped parts are advantageously kept ready for several standard receptacle types such as say 200-liter drums, 280-liter drums and laid out for different loading plans, whereby the following typical examples can occur:

a) 48 200-liter drums (two-layer, each layer 24 drums) each weighing 437.5 kg maximum; total load weight (including load-securing means): 22000 kg;

b) 24 200-liter drums (single-layer) each weighing 875 kg; total weight (including load-securing means): 22000 kg;

c) 42 280-liter drums (two-layer, each layer 21 drums) each weighing 500 kg; total weight (including load-securing means): 22000 kg;

b) 21 280-liter drums (single-layer) each weighing 1000 kg; total weight (including load-securing means): 22000 kg.

I claim:

1. Transport device for hazardous goods receptacles, with an ISO container receiving the hazardous goods receptacles and means for securing the loads of the hazardous goods receptacles within the container, wherein the load-securing means comprises: a first receiving surface completely filling the bottom surface of the container (1) with openings (12) each for receiving with a precise fit a lower region of a hazardous goods receptacle (2), and a second receiving surface which completely fills an intermediate surface, parallel to the bottom surface, of the container and which has openings (21) each for receiving with a precise fit an upper region of a hazardous goods receptacle (2) fitted onto the first receiving surface, characterized in that the first receiving surface is formed by a plurality of separate first preshaped parts (10) which are movable one against the other and which abut one against the other and, at the edges of the first receiving surface, are supported by the container walls, the second receiving surface is formed by a plurality of separate second preshaped parts (20) which are movable one against the other and which abut one against the other and, at the edges of the second receiving surface, are supported by the container walls wherein the first and second preshaped parts (10, 20) have recesses (24) at their edges by which cavities open to the top are formed into which wedges can be inserted between adjoining preshaped parts (10, 20).

2. Transport device according claim 1, characterized in that on the upper side the second preshaped parts (20) have cavities which form grooves (26), running essentially transversely to the longitudinal axis of the container in the second receiving surface, into which holding rods lockable in the container wall can be inserted.

3. Transport device according to claim 1, characterized in that the first and second preshaped parts (10, 20) each have an essentially rectangular surface area of a size such that every preshaped part (10, 20) extends in the container transversely to its longitudinal direction from one side wall to the other.

4. Transport device according to claim 1, characterized in that the second preshaped parts (20) are provided on both sides with openings (21, 22) in such a way that on the upper side the second receiving surface has openings (22) each for receiving with a precise fit a lower region of a hazardous goods receptacle (2').

5. Transport device according to claim 4, characterized in that the load-securing means have a plurality of third preshaped parts (30) which have openings (31) each for receiving with a precise fit an upper region of a hazardous goods receptacle (2') and are so designed that, placed onto the hazardous goods receptacles (2') fitted in the second receiving surface, they form a third receiving surface which completely fills an intermediate surface, parallel to the bottom surface, of the container.

6. Transport device according to claim 5, characterized in that at their edges the third preshaped parts (30) have recesses (34) by which cavities open to the top into which wedges can be inserted are formed between adjoining preshaped parts (30) in the third receiving surface.

7. Transport device according to claim 6, characterized in that on the upper side the third preshaped parts (30) have recesses which form grooves (36), running essentially transversely to the longitudinal axis of the container in the third receiving surface, into which holding rods lockable in the container wall can be inserted.

8. Transport device according to claim 7, characterized in that, between the third receiving surface and the cover wall of the container, supporting parts with an adjustable height support the third receiving surface against the cover surface.

9. Transport device according to claim 1, characterized in that the first, second and third preshaped parts (10, 20, 30) consist of an elastomer material.

10. Transport device according to claim 1, characterized in that the first, second and third preshaped parts (10, 20, 30) are sheets with, outside the openings (12, 21, 22, 31), a thickness that is constant and uniform between one another.

11. Method of securing the loads of hazardous goods receptacles in ISO containers for transport, wherein as a load securing means the bottom surface of the container (1) is completely filled with a first receiving surface with openings (12) each for receiving with a precise fit a lower region of a hazardous goods receptacle (2), the hazardous goods receptacles (2) are fitted into the openings (12), and an intermediate surface, parallel to the bottom surface, of the container is completely filled with a second receiving surface which has openings (21) each for receiving with a precise fit an upper region of a hazardous goods receptacle (2) fitted onto the first receiving surface, charcterised in that the first receiving surface is filled by placing a plurality of first separate preshaped parts (10) so that they are abutting and movable one against the other, and, at the edges of the first receiving surface, are supported by the container walls, that the second receiving surface is formed by a plurality of second separate preshaped parts (20) with its openings fitted onto the hazardous goods receptacles (2), wherein the second preshaped parts are formed such that they, abutting one against the other, completely fill an intermediate surface, parallel to the bottom surface, of the container and are supported at the edges of the second receiving surface by the container walls, and that wedges with a high weight are inserted into cavities of the first and/or second receiving surface, which cavities are formed by recesses (24) in the edges of adjoining preshaped parts (10, 20).

12. Method according to claim 11, characterized in that holding rods are inserted essentially transversely to the longitudinal direction of the container into grooves (26)

provided for them in the upper side of the second receiving surface and are locked in the side walls of the container.

13. Method according to claim 11, characterized in that first and second preshaped parts (10, 20) with an essentially rectangular surface area with such a size are used that they extend in the container transversely to its longitudinal direction from one side wall to the other.

14. Method according to one claim 11, characterized in that second preshaped parts (20) are used which are provided on both sides with openings (21, 22) in such a way that on the upper side the second receiving surface has openings (22) each for receiving with a precise fit a lower region of a hazardous goods receptacle (2'), in that hazardous goods receptacles (2') are inserted into the openings (22) of the second receiving surface and in that a plurality of third preshaped parts (30) which have openings (31) each for receiving with a precise fit an upper region of a hazardous goods receptacle (2') are fitted onto the hazardous goods receptacles (2') of the second receiving surface in such a way that, abutting one against the other, they form a third receiving surface which completely fills an intermediate surface, parallel to the bottom surface, of the container.

* * * * *